(12) United States Patent
Gale et al.

(10) Patent No.: US 7,380,154 B2
(45) Date of Patent: May 27, 2008

(54) METHOD AND APPARATUS FOR NETWORK FAULT CORRECTION VIA ADAPTIVE FAULT ROUTER

(75) Inventors: Alan Gale, Carver, MA (US); Richard Coombs, Wrentham, MA (US); Krishan Kumar Dhupar, North Attleboro, MA (US); Alan M. Foskett, Mansfield, MA (US); Douglas MacDougall, Plainville, MA (US)

(73) Assignee: Invensys Systems, Inc., Foxboro, MA (US)

( * ) Notice: Subject to any disclaimer, the term of this patent is extended or adjusted under 35 U.S.C. 154(b) by 482 days.

(21) Appl. No.: 10/962,846

(22) Filed: Oct. 12, 2004

(65) Prior Publication Data

US 2005/0050379 A1 Mar. 3, 2005

Related U.S. Application Data

(62) Division of application No. 10/012,623, filed on Dec. 7, 2001, now Pat. No. 6,868,509.

(51) Int. Cl.
*G06F 11/00* (2006.01)
(52) U.S. Cl. .............................. 714/4; 714/43; 370/226
(58) Field of Classification Search .................. 714/4, 714/43; 370/226
See application file for complete search history.

(56) References Cited

U.S. PATENT DOCUMENTS

| | | | | |
|---|---|---|---|---|
| 4,337,463 A | * | 6/1982 | Vangen | 340/825.2 |
| 4,731,784 A | * | 3/1988 | Keller et al. | 398/99 |
| 5,008,805 A | * | 4/1991 | Fiebig et al. | 700/79 |
| 5,235,599 A | * | 8/1993 | Nishimura et al. | 714/4 |
| 5,315,593 A | * | 5/1994 | Adachi et al. | 370/401 |
| 5,390,326 A | * | 2/1995 | Shah | 370/222 |
| 5,432,907 A | | 7/1995 | Picazo, Jr. et al. | |
| 5,682,479 A | | 10/1997 | Newhill et al. | |
| 5,720,032 A | | 2/1998 | Picazo, Jr. et al. | |
| 5,721,819 A | | 2/1998 | Galles et al. | |
| 5,737,525 A | | 4/1998 | Picazo, Jr. et al. | |
| 5,742,760 A | | 4/1998 | Picazo, Jr. et al. | |
| 5,771,349 A | | 6/1998 | Picazo, Jr. et al. | |

(Continued)

FOREIGN PATENT DOCUMENTS

JP 407264233 A 10/1995

(Continued)

OTHER PUBLICATIONS

Hardware Server: Introduction to RS 422 and 485. hwserver.com, copyright 1998.

(Continued)

*Primary Examiner*—Bryce P Bonzo
(74) *Attorney, Agent, or Firm*—Leydig, Voit & Mayer, Ltd.

(57) ABSTRACT

A fault router method and system for use in a parallel redundant network environment provide additional safeguards over traditional redundant networks. Where multiple connection faults on multiple machines would ordinarily stifle communications between two or more network entities, the fault router passes packets between redundant networks to bypass connection faults. Compatibility and timing improvements allow for the extension of the parallel network environment, and provide for time-synchronized network operation.

6 Claims, 12 Drawing Sheets

U.S. PATENT DOCUMENTS

| | | | |
|---|---|---|---|
| 5,805,816 A | 9/1998 | Picazo, Jr. et al. | |
| 5,812,751 A * | 9/1998 | Ekrot et al. | 714/4 |
| 5,835,696 A | 11/1998 | Hess | |
| 5,841,990 A | 11/1998 | Picazo, Jr. et al. | |
| 5,933,591 A | 8/1999 | Mazzurco | |
| 5,958,064 A * | 9/1999 | Judd et al. | 714/4 |
| 6,006,275 A | 12/1999 | Picazo, Jr. et al. | |
| 6,091,732 A | 7/2000 | Alexander, Jr. et al. | |
| 6,091,804 A * | 7/2000 | Banerjee | 379/93.01 |
| 6,108,300 A * | 8/2000 | Coile et al. | 370/217 |
| 6,119,170 A * | 9/2000 | Schoffelman et al. | 709/244 |
| 6,148,410 A * | 11/2000 | Baskey et al. | 714/4 |
| 6,173,411 B1 * | 1/2001 | Hirst et al. | 714/4 |
| 6,199,170 B1 * | 3/2001 | Dietrich | 713/400 |
| 6,230,281 B1 * | 5/2001 | Brodfuhrer et al. | 714/4 |
| 6,272,107 B1 * | 8/2001 | Rochberger et al. | 370/216 |
| 6,311,284 B1 * | 10/2001 | Dwork | 713/400 |
| 6,324,161 B1 * | 11/2001 | Kirch | 370/217 |
| 6,370,381 B1 * | 4/2002 | Minnick et al. | 455/445 |
| 6,438,702 B1 * | 8/2002 | Hodge | 713/400 |
| 6,442,703 B1 * | 8/2002 | Nakamura | 713/500 |
| 6,496,942 B1 * | 12/2002 | Schoenthal et al. | 714/4 |
| 6,535,990 B1 * | 3/2003 | Iterum et al. | 714/4 |
| 6,542,934 B1 * | 4/2003 | Bader et al. | 709/239 |
| 6,594,776 B1 * | 7/2003 | Karighattam et al. | 714/4 |
| 6,721,801 B2 * | 4/2004 | Najjar | 709/242 |
| 6,760,766 B1 * | 7/2004 | Sahlqvist | 709/227 |
| 7,002,908 B1 * | 2/2006 | Lund et al. | 370/228 |
| 7,136,903 B1 * | 11/2006 | Phillips et al. | 709/217 |
| 2001/0022536 A1 * | 9/2001 | Kallio et al. | 331/1 R |
| 2001/0052084 A1 * | 12/2001 | Huang et al. | 714/4 |
| 2002/0018258 A1 * | 2/2002 | Schmitt et al. | 359/118 |
| 2002/0018447 A1 * | 2/2002 | Yamada et al. | 370/252 |
| 2002/0024931 A1 * | 2/2002 | Chikazawa et al. | 370/228 |
| 2002/0069299 A1 * | 6/2002 | Rosener et al. | 709/248 |
| 2002/0091957 A1 * | 7/2002 | Hertwig et al. | 713/400 |
| 2002/0097745 A1 * | 7/2002 | Brolin et al. | 370/466 |
| 2002/0101869 A1 * | 8/2002 | Garcia-Luna-Aceves et al. | 370/389 |
| 2003/0067884 A1 * | 4/2003 | Abler et al. | 370/252 |
| 2003/0084190 A1 * | 5/2003 | Kimball | 709/248 |
| 2003/0118040 A1 * | 6/2003 | Black et al. | 370/403 |
| 2004/0042499 A1 * | 3/2004 | Piercy et al. | 370/503 |
| 2004/0081117 A1 * | 4/2004 | Malek et al. | 370/324 |

FOREIGN PATENT DOCUMENTS

JP 02000324154 A 11/2000

OTHER PUBLICATIONS

Mills, David, A Brief History of NTP Time: Memoirs of an Internet Timekeeper ACM SIGCOMM Computer Communications Review, vol. 33, No. 2, pp. 9-21 (2003).

* cited by examiner

FIG 5A
Machine A Routing Table (No Faults)

| MACHINE \ PATH | PREFERRED PATH | ALTERNATE PATH |
|---|---|---|
| MACHINE A | Network A | Network B |
| MACHINE B | Network B | Network A |
| MACHINE C | Network A | Network B |
| MACHINE D | Network B | Network A |

FIG 5B
Machine A Routing Table (Fault on Network A)

| MACHINE \ PATH | PREFERRED PATH | ALTERNATE PATH |
|---|---|---|
| MACHINE A | Network B | Fault Router via Network A |
| MACHINE B | Network B | Fault Router via Network B |
| MACHINE C | Network B | Fault Router via Network B |
| MACHINE D | Network B | Fault Router via Network B |

FIG 5C
Machine D Routing Table

| PATH / MACHINE | PREFERRED PATH | ALTERNATE PATH |
|---|---|---|
| MACHINE A | Network B | Fault Router via Network A |
| MACHINE B | Network B | Network A |
| MACHINE C | Network A | Network B |
| MACHINE D | Network B | Network A |

FIG 6A
Machine B Routing Table
(Machine D faulted on Network B, Machine B faulted on Network A)

| MACHINE / PATH | PREFERRED PATH | ALTERNATE PATH |
|---|---|---|
| MACHINE A | Network B | Fault Router via Network B |
| MACHINE B | Network B | Fault Router via Network A |
| MACHINE C | Network B | Fault Router via Network B |
| MACHINE D | Fault Router via Network B | Fault Router via Network B |

FIG 6B
Machine D Routing Table
(Machine D faulted on Network B, Machine B faulted on Network A)

| MACHINE / PATH | PREFERRED PATH | ALTERNATE PATH |
|---|---|---|
| MACHINE A | Network A | Fault Router via Network A |
| MACHINE B | Fault Router via Network A | Fault Router via Network A |
| MACHINE C | Network A | Fault Router via Network A |
| MACHINE D | Network A | Fault Router via Network B |

FIG 6C
Machine A Routing Table
(Machine D faulted on Network B, Machine B faulted on Network A)

| MACHINE / PATH | PREFERRED PATH | ALTERNATE PATH |
|---|---|---|
| MACHINE A | Network A | Network B |
| MACHINE B | Network B | Fault Router Via Network A |
| MACHINE C | Network A | Network B |
| MACHINE D | Network A | Fault Router Via Network B |

METHOD AND APPARATUS FOR NETWORK FAULT CORRECTION VIA ADAPTIVE FAULT ROUTER

RELATED APPLICATIONS

This application is a divisional of U.S. application Ser. No. 10/012,623, filed Dec. 7, 2001, entitled "Method and Apparatus for Network Fault Correction Via Adaptive Fault Router".

TECHNICAL FIELD

This invention relates generally to computer network fault correction and, more particularly, relates to the use of a fault router in conjunction with multiple redundant networks to provide for network fault recovery.

BACKGROUND OF THE INVENTION

Computer networks have taken on a role of central importance in today's highly electronic society. For example, computer networks provide an interactive environment in academic and entertainment settings, and provide workers, companies and business personnel with remote access to important information, facilitating telecommuting or remote management or collaboration. More significantly, computer networks are increasingly important to industrial concerns for the operation and management of manufacturing facilities. For example, many factories for production or assembly are highly computerized, and rely on sophisticated networks of computers and computing devices to carry out process or assembly steps.

As society becomes increasingly reliant on computer networks, the consequences of network failure loom larger. For example, network failures may be responsible for loss of communication between a manager and managed personnel or processes, or between cooperating devices on a single network. Especially in an industrial setting, such failures can be costly due to lost materials or productivity, and may also be dangerous to personnel or to critical facilities.

There currently exist a number of proposed solutions to the problem of network failure. The most effective of these solutions provide redundant information pathways, such as over redundant parallel networks. Thus when one pathway becomes faulted, communications will shift to a parallel network. However, such mechanisms do not necessarily provide continued connectivity between network entities when two or more such entities have network faults on different networks, effectively eliminating all network pathways of communication. The danger of such accumulated faults exists at some level in networks of all sizes, but increases with increased network size. In particular, traditional redundant network solutions have a reasonable chance of providing the necessary protections on very small networks, because the statistical probability of multiple faults at a single point in time is small. However, as the number of interconnected network entities increases, even into the hundreds and thousands of entities in some cases, the probability of simultaneous faults on different machines on different paths increases to unacceptable levels. Similarly, as the time required to repair one network fault increases, the probability of a simultaneous fault on another machine increases. For example, Commercial Switch-based recovery algorithms such as spanning tree may consume 5 seconds or more to fix a fault, rendering unattainable ideal recovery times of about one or two seconds.

The multitude and variety of failure scenarios presented by traditional redundant networks creates a need for a more robust redundant network solution. Such a solution should accommodate many patterns of multiple simultaneous network faults without allowing complete failure of communications between singly-faulted network entities, while providing rapid recovery.

SUMMARY OF THE INVENTION

The present invention provides an improved architecture for supplying redundant network pathways between network entities. In particular, the redundant networks are coupled to a network fault router that ensures that all of the redundant networks are usable by any network entity that has an operable connection to any one of the redundant networks.

Network faults are detected by any conventional mechanism, such as via an automatic periodic integrity check routine using probe pulses. After a fault occurs and is detected, network paths are reestablished such that an affected machine having at least one functioning network connection remains connectable to other network entities that also have at least one functioning network connection. Thus for example, two faulted machines may still communicate regardless of whether their faults are on the same or different networks. Similarly, a machine with one network connection fault can still intercommunicate with non-faulted network entities.

In an embodiment, the fault router is itself backed up by a redundant fault router. This provides additional protection, ensuring that partial or complete network connection faults at the primary fault router do not foreclose network communications between non-faulted and/or partially faulted network entities. In a further embodiment, two or more fault routers are used to increase bandwidth during fault periods.

In a further embodiment, the redundant network system serves as an industrial control network for monitoring, managing, and/or controlling an industrial process such as an assembly or manufacturing process.

Additional features and advantages of the invention will be made apparent from the following detailed description of illustrative embodiments, with reference to the accompanying figures.

BRIEF DESCRIPTION OF THE DRAWINGS

While the appended claims set forth the features of the present invention with particularity, the invention will be best understood from the following detailed description taken in conjunction with the accompanying drawings of which:

FIG. 5a is a routing table for a given network machine for the case where no network connection faults have been detected;

FIG. 5b is a routing table for a given network machine for the case where a single network connection fault with respect to one network connection of that machine has been detected;

FIG. 5c is a routing table for a non-faulted network machine for the case where a single network connection fault with respect to one network connection of another machine has been detected;

FIG. 6a is a routing table for a first faulted network machine for the case where two network connection faults have been detected;

FIG. 6b is a routing table for a second faulted network machine for the case where two network connection faults have been detected;

FIG. 6c is a routing table for a non-faulted network machine for the case where two network connection faults have been detected;

DETAILED DESCRIPTION OF THE INVENTION

The invention is described herein by way of reference to a fairly simple network environment for clarity of explanation. Those of skill in the art will appreciate that the principles of the invention described herein apply equally to more complex network environments such as those involving several thousand networked machines in networks having intermediate nodes and switches, with respect to network machines that communicate over physically redundant networks. Furthermore, although specific network protocols are used for purposes of exemplification, those of skill in the art will appreciate that the invention may be implemented using additional or alternative protocols. As such, the invention is not limited to the specific implementations shown, but rather is more widely applicable. As used herein, the terms "machine" and "entity" refer to any device having networking logic, such as the ability to maintain routing tables, and network hardware for connection to the appropriate networks. Examples include but are not limited to computers, workstations, field devices, controllers such as control processors, audio and/or video teleconferencing apparatus, servers, network bridges (such as between a local and wide area network), intelligent printers, database devices, diagnostic consoles, etc.

Figure 1A:
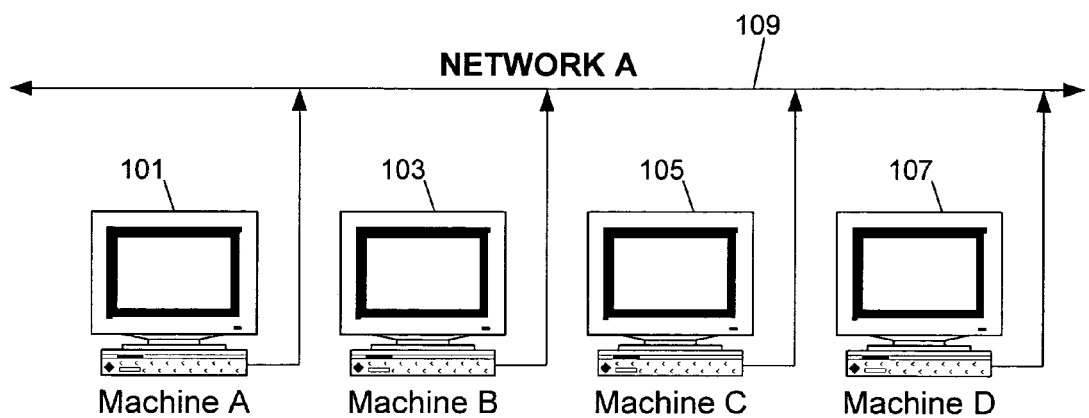
FIG. 1a is a simplified schematic drawing illustrating one typical traditional network architecture that does not provide redundant network connectivity, for the case where no machine has a faulted network connection.

FIG. 1a illustrates a typical prior art network environment. In particular, Machine A 101, Machine B 103, Machine C 105, and Machine D 107 are communicably linked via network A 109. Thus, any of these machines may communicate with any other of these machines via the network A 109. Depending upon the specific topology and protocol employed, the machines may have simultaneous or sequential access to network communications. For example, in a token ring network or FDDI LAN, each machine receives and either retains or passes along each network communication. In other network types, a communication on the network A 109 is generally received essentially simultaneously by all connected machines, which then decide based on addressing or other information whether they are the intended recipient. The intended recipient then acts upon the received communication contents in the appropriate manner, while all other machines ignore the communication contents.

Figure 1B:
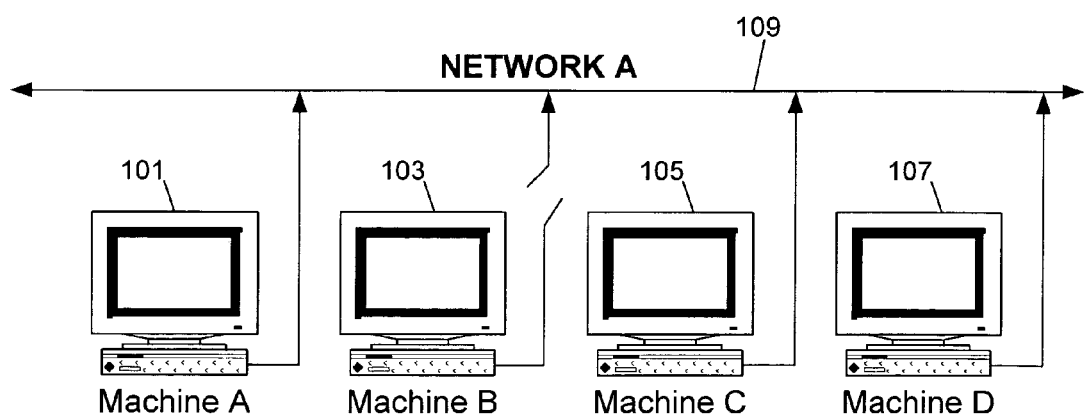
FIG. 1b is a simplified schematic drawing illustrating one typical traditional network architecture that does not provide redundant network connectivity, for the case where one machine has a faulted network connection.

Regardless, a fault in the network connection of any machine in the topology of FIG. 1 immediately isolates that machine from the other networked machines. FIG. 1b illustrates one possible conventional network failure scenario. In particular, Machine B 103 is illustrated as having a network connection fault. In this situation, Machine B 103 can no longer communicate to any other network machine, and no other network machine can communicate with Machine B 103. The loss of connectivity is complete. In a situation where communication with Machine B is critical, failure occurs. For example, if Machine B 103 is providing one step in a sequence of manufacturing or assembly steps under the overall control of another network machine such as a controller or management station, failure or cessation of the process occurs, with all attendant repercussions.

Figure 2A:
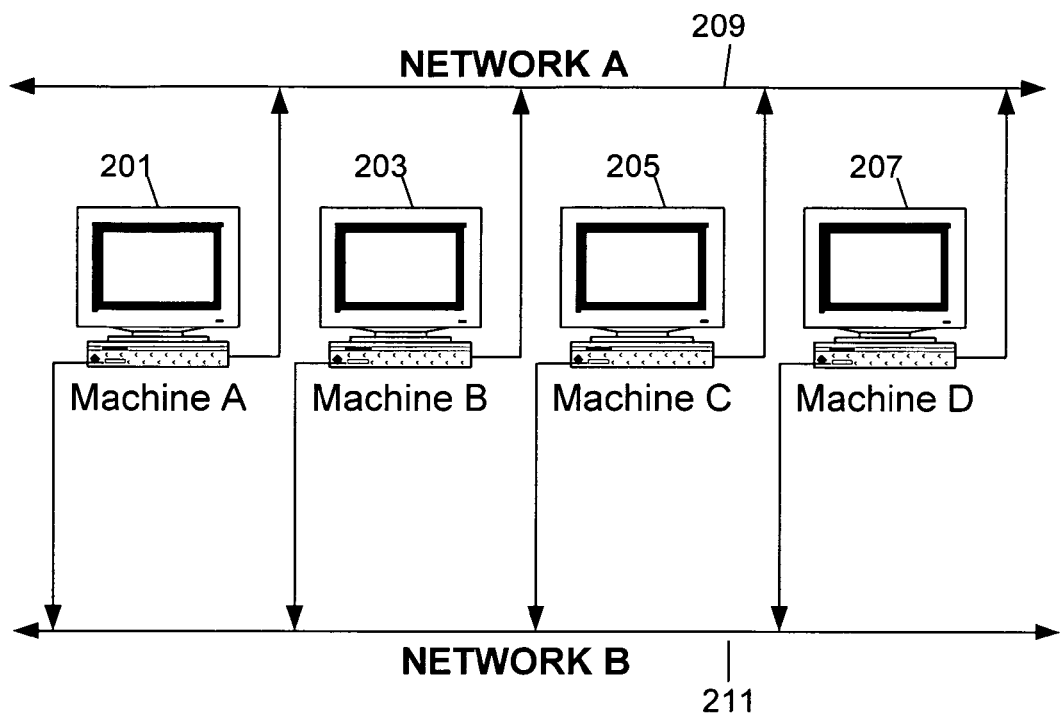
FIG. 2a is a simplified schematic drawing illustrating a traditional network architecture wherein redundant network pathways are provided with respect to each machine, for the case where no machine has a faulted network connection.

Illustrated in FIG. 2a is another prior art network architecture that improves over the topology illustrated in FIGS. 1a and 1b. In particular, Machine A 201, Machine B 203, Machine C 205, and Machine D 207 are communicably linked via network A 209 and further by redundant network B 211. In this situation, network machines may communicate on either network in the absence of faults. Typically in active environments, both networks are ordinarily employed to some extent to minimize network congestion.

Figure 2B:
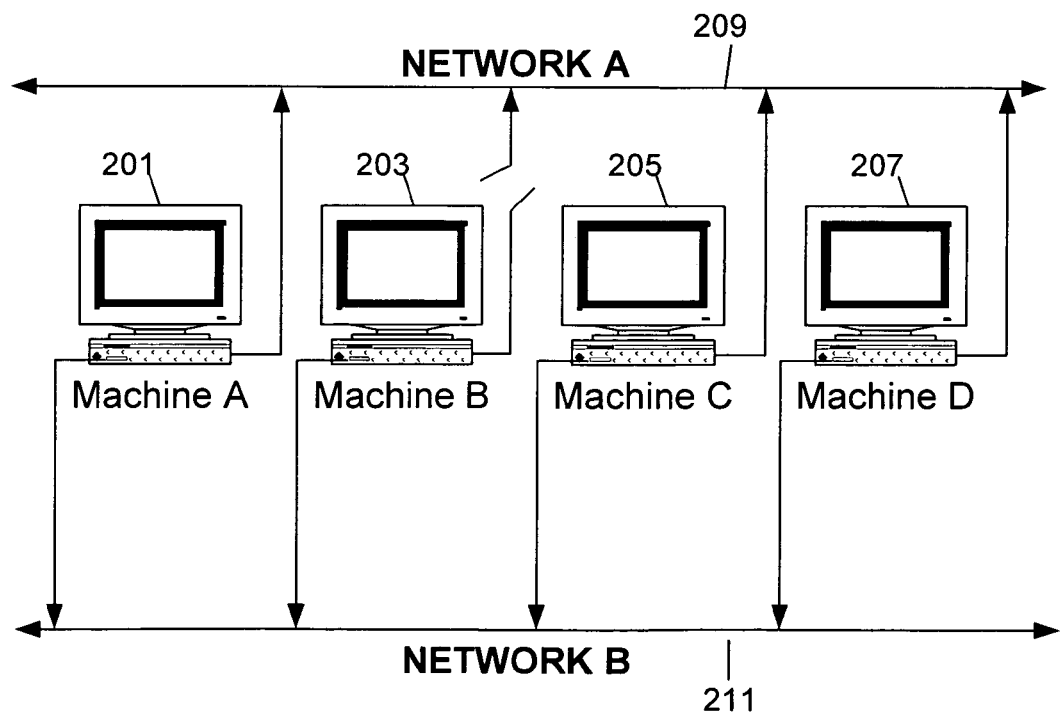
FIG. 2b is a simplified schematic drawing illustrating a traditional network architecture wherein redundant network pathways are provided with respect to each machine, for the case where one machine has a faulted network connection.
Figure 2C:
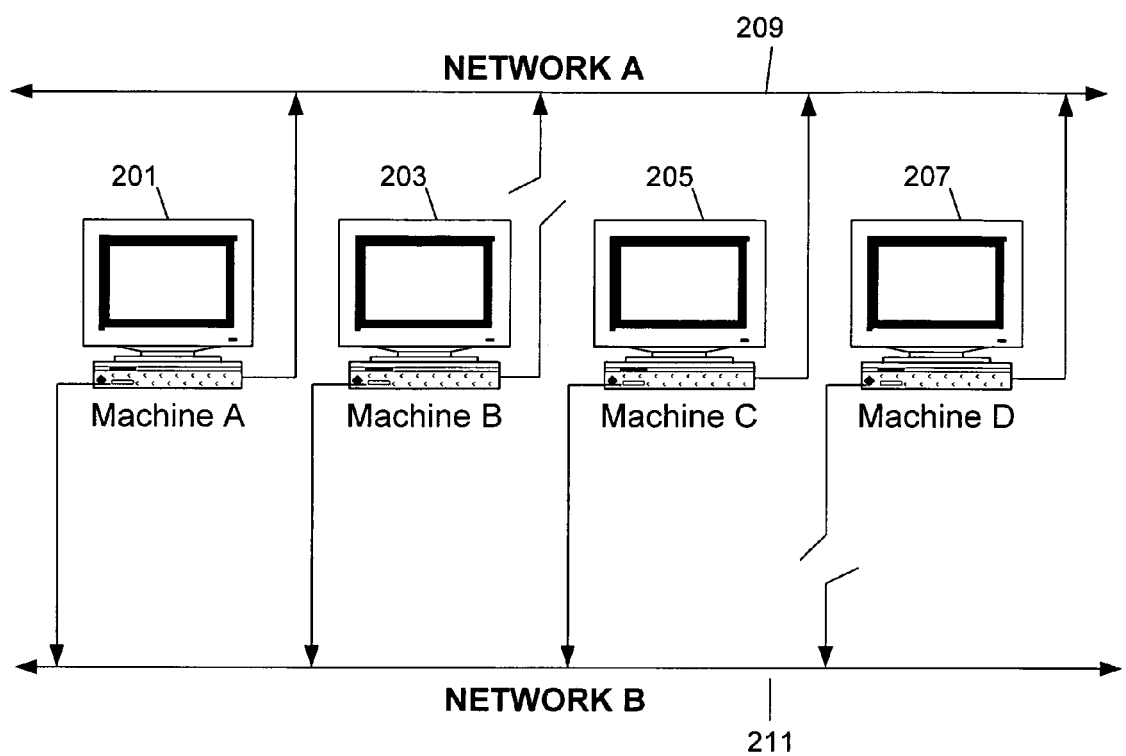
FIG. 2c is a simplified schematic drawing illustrating a traditional network architecture wherein redundant network pathways are provided with respect to each machine, for the case where two machines each have one faulted network connection.

FIG. 2b illustrates a failure scenario involving a single fault. In particular, Machine B 203 is illustrated as having a network fault on network A 209. Because of the redundant network architecture, Machine A 201, Machine C 205, and Machine D 207 can still communicate with Machine B 203 by using network B 211. However, such a topology does not by itself provide protection against a myriad of types of multiple faults. FIG. 2c illustrates one such scenario. In particular, Machine B 203 is illustrated as having a connection fault to network A 209 while Machine D 207 is shown to have a connection fault to network B 211. In this situation, communications between Machine B 203 and Machine D 207 are no longer possible. For higher redundancies, i.e. for three or more redundant parallel networks, similar failure scenarios can occur. For example, two triply connected machines faulted respectively on a first and second, and a second and third network of three redundant networks will present a similar problem. Thus it can be seen that network redundancy in and of itself does not provide adequate assurances of network connectivity in the case of multiple faults, even where each machine still has at least one operable network connection.

Figure 3:
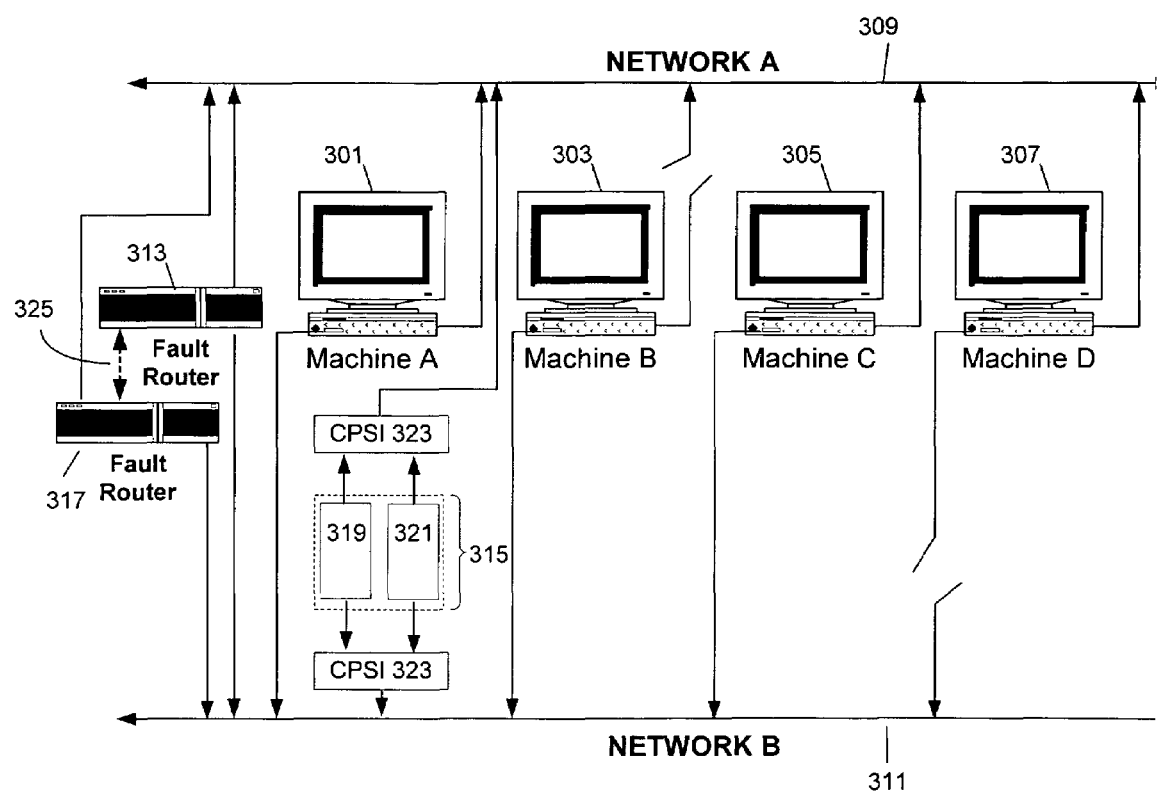
FIG. 3 is a simplified schematic drawing illustrating an improved network configuration according to an embodiment of the invention.

Referring to FIG. 3, there is shown a network configuration according to an embodiment of the invention. In particular, at least two redundant networks, illustrated as network A 309 and network B 311, provide parallel paths between a plurality of network computers or devices, illustrated as Machine A 301, Machine B 303, Machine C 305, and Machine D 307. Furthermore, at least one network fault router 313 maintains a network connection to each of network A 309 and network B 311. As will be described hereinafter, this configuration in conjunction with a routing scheme assures network connectivity to and from machines having at least one non-faulted network connection. In addition, any machine can have redundant connections to one or more of the redundant networks, providing an added level of fault tolerance. One such machine is a controller illustrated as fault tolerant control processor 315.

Note that the redundant network system can serve as an industrial control network for monitoring, managing, and/or controlling an industrial process such as an assembly or manufacturing process. In this context, the network system includes one or more industrial network machines such as controllers, illustrated as control processor 315, usable to interface with the relevant industrial process. In particular, the control processor 315 or other industrial network machine manages, monitors, and/or controls field devices or other devices that perform a process step or function or that gather information regarding a process. In this environment, the redundant network system serves to maintain network communication between control processor 315 and another networked device be it another controller, a controlled field device, a management console, a remote management machine, etc.

It can be seen in FIG. 3 that fault tolerant control processor 315 comprises two control processors, a primary 319 and a shadow 321. The shadow processor 321 does not transmit other than for diagnostic purposes, but maintains the same state as the primary processor 319. In the event of a failure of the primary processor 319, the shadow processor 321 assumes the role of primary during the time that the primary processor 319 remains faulted. The network connections of the processors 319, 321 are coupled into a Control Processor Switch Interface (CPSI) 323. The CPSI 323 is simply a fiber signal splitter that sends network transmissions to both processors 319, 321 and that sends transmissions from either processor to the associated network.

With respect to the fault router mechanism described hereinafter, a fault tolerant control processor or other machine redundantly connected to each parallel network is deemed to have a connection fault with respect to a particular network when the primary processor connection to the CPSI 323, to another signal splitter, or directly to the relevant network, is faulted. Alternatively, such a processor is deemed to have a connection fault with respect to a particular network when both the primary and shadow processor connections are faulted.

The redundant networks in the redundant network system operate according to the 100 Mbps 802.3u Fast Ethernet standard in an embodiment of the invention. However, those of skill in the art will appreciate that the network standard used is not critical and that other network types that accommodate redundancy may be used instead. Such other network types include but are not limited to HDLC, ATM, IEEE 802.3, Gigabit Ethernet, and may utilize TCP-IP, UDP, or other transport protocol.

Initially, each of Machine A 301, Machine B 303, Machine C 305, and Machine D 307 selects or is assigned a primary network of the redundant networks 309, 311, with the other network or networks being used by the respective machine for receipt only in the case of a failure on its primary network. All machines can have the same primary network, although for bandwidth-limited networks, it is desirable to disperse the network traffic among all available redundant networks to reduce the network traffic load on each network. In such a situation, Machine A 301 and Machine B 303 could be assigned network A 309 as their primary network while Machine C 305 and Machine D 307 could be assigned network B 311 as their primary network, for example. It will be appreciated that the same principles apply whether or not all machines initially have common or varied primary networks.

Each machine and the fault router 313 have communications hardware associated with both redundant networks. Furthermore, as will be described in greater detail hereinafter, each machine maintains networking logic and a routing table that describes the pathways to be used to communicate with all other machines. Any of the redundant networks may also be connected to a machine that is not connected to all others of the redundant networks. However, that particular machine will not take full advantage of the protections afforded by the network fault router system.

The fault router 313 is any computing device with the capability and bandwidth necessary to route packets to and from any machine or machines having at least one failed communications port. The fault router 313 networking logic maintains two communication stacks, one for each of the redundant networks 309, 311. The fault router 313 also comprises two hardware communication ports, each associated with a communication stack. In order to perform its routing function, the fault router 313 employs its networking logic to link a received target address to an entry in the routing table to determine which network to utilize to reach the target address. The routing table initially contains the default primary and alternate network information for each machine, and is subsequently updated with fault information transmitted from faulted machines.

When a faulted machine communicates via its non-faulted connection with a machine having the non-faulted network as its primary path, the fault router 313 does not interfere with communications between the two machines. As will be described in greater detail, the fault router allows continued communication to and from a faulted station having at least one functioning connection, while maintaining network redundancy for all non-faulted stations.

The following brief overview is provided in order to familiarize the reader with the basic operation of the fault router 313 before a more detailed discussion is presented. With reference to FIG. 3, it will be seen that the four exemplary machines illustrated are redundantly connected via networks A 309 and B 311. If any of these machines experiences a communications fault to one network, the fault router 313 allows other machines communicating exclusively on the faulted network to still communicate with the faulted machine. This is accomplished via the fault router 313 by receiving communications on the faulted network destined for the faulted machine and using its networking logic to route such communications over to the non-faulted network, where the faulted machine receives them at its non-faulted port. Similarly, communications from the faulted machine on its non-faulted network connection can be routed across to the faulted network to communicate with other machines that are primarily or exclusively using that network to communicate. In this manner, the fault router 313 ensures that any machine having at least one non-faulted connection will be able to communicate with any other machine having at least one non-faulted connection. Thus, most configurations of multiple simultaneous network connection faults on different machines will not interrupt connectivity between networked machines. At the same time, redundant connections are maintained with respect to non-faulted machines.

The operation of the fault router 313 will now be described in greater detail. Note that the fault router 313 is optionally redundant, with a backup fault router 317 optionally provided. The backup fault router 317 operates in the same manner as the fault router 313, termed a "primary fault router" if a backup fault router 317 is provided, except that the backup fault router 317 does not route packets between the parallel networks while it remains in backup mode. Thus during normal operation when the primary fault router 313 is operational, the backup fault router 317 receives the same information the primary fault router 313 receives and maintains the same state as the primary fault router 313.

The backup fault router 317 also periodically receives an indication of the status of the primary fault router 313 via interface 325. This can be either by periodically probing the primary fault router 313, or by receiving a status message periodically from the primary fault router 313. Once the backup fault router 317 detects that the primary fault router 313 is not operational, the backup fault router assumes the role of primary fault router 313, i.e. actively mitigating network connection faults by transferring packets between the parallel networks. This role reversal continues until the prior primary fault router 313 is again operational.

A supplemental fault router is also optionally provided. The supplemental fault router is connected in the same manner and operates in the same manner as the primary fault router 313, with the exception that each of the primary 313 and supplemental fault routers only mitigate a subset of the network connection faults so that together they mitigate to the extent possible all network connection faults. The primary 313 and supplemental fault routers are statically or dynamically assigned to guard certain network machines or domains, increasing the bandwidth available for bypassing network connection faults. Each supplemental fault routers is also optionally associated with one or more backup fault routers. The primary and supplemental routers may also interface via an interface such as 325 in order to coordinate operations.

The basic operation of each fault router is as follows. At start up, the fault router establishes its operational mode as primary or backup. The router then adjusts its MAC address in accordance with the operational mode. In particular, the primary and backup routers have separate fixed MAC addresses. The network machines that would use the fault router are aware of the primary address. In an embodiment, each router establishes a heartbeat probe with the other associated router in the primary-backup router pair. The heartbeat probes allow each fault router in the pair to monitor the status of the other, and also to periodically notify the associated network switch in the parallel network system of its MAC address.

The networking logic of the routers further includes several basic features. Each router is programmed to route unicast packets or frames addressed to it by copying the destination MAC address in the packet network header to the packet MAC header destination address, and then routing the packet via the other network port as a unicast. Similarly, each router is programmed to route multicast packets or frames addressed to it by copying the destination MAC address in the packet network header to the packet MAC header destination address, and then routing the packet via the other network port as a multicast. Note that each router is programmed to ignore multicast packets not addressed specifically to the router. Due to the built-in routable nature of IP packets, these are routed by each router in the standard manner. The method used to route such packets is similar to that used by the I/A SERIES LAN INTERFACE MODULE by FOXBORO COMPANY. Certain types of packets or frames have the fault router as a destination, and as such are not routed, but rather are used internally by the router. Such packets or frames include router status requests as well as other informational or operational requests by system or network management.

When a router is operating as the backup router and the primary router is detected to be failed, the backup router is programmed to assume the primary operational mode, adjusting the MAC address for the new primary router (itself) and sending a multicast frame to the redundant network system so that the network switch learns of the fault router address shift. A new multicast group is created for this purpose. Meanwhile, the router adjusts the router status for reporting to system management and attempts to re-establish a heartbeat with the failed router over both ports.

Figure 4:
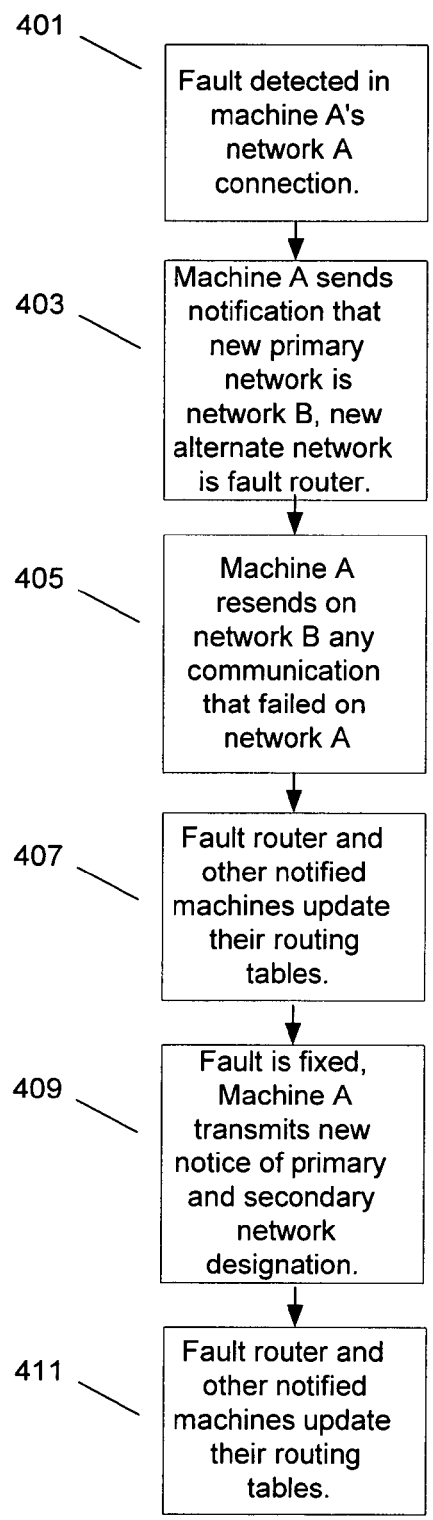
FIG. 4 is a flow chart illustrating the steps taken within an embodiment of the invention to detect and correct network faults.

The flow chart of FIG. 4, in conjunction with the routing tables of FIGS. 5a, 5b, 5c, 6a, 6b, and 6c, illustrates in greater detail the steps taken within an embodiment of the invention to detect and correct network faults. Prior to the detection of a fault in a machine's connection to one of the redundant networks, each station maintains a routing table describing the path to be used to communicate with all other machines. FIG. 5a shows the routing table maintained by Machine A 301 at such a time.

The Machine A routing table of FIG. 5a shows that Machine A's preferred incoming path is network A 309, while the preferred path to communicate with Machine B 303 is network B 311, the preferred path to communicate with Machine C 305 is network A 309, and the preferred path to communicate with Machine D 307 is network B 311. For each machine, the alternate path is shown to be the other of the redundant networks. As discussed above, it is often efficient to vary the network used as a primary for each machine to utilize the increased bandwidth provided by the redundant networks.

Referring to FIG. 4, which sets forth the steps taken in an embodiment of the invention to detect and correct a single fault, the diagnostics in Machine A's network A communication logic detects a fault in the network A connection at step 401. At step 403, Machine A 301 updates it routing table and notifies the fault router 313 and all other network entities with which it is in communication that Machine A's preferred incoming path is now network B, while the preferred path to transmit to all other machines is also network B. The alternate path used by Machine A 301 to receive is the fault router 313, via network A 309, while the alternate path to transmit to other machines is the fault router 313 via network B 311. Machine A's updated routing table is shown in FIG. 5b.

In step 405, Machine A 301 attempts to resend on network B 311 any communication that failed due to the failed network connection of Machine A 301 to network A 309. In step 407, the fault router 313 and other notified machines update their routing tables. Assuming for example that Machine D is one of the notified machines, its updated routing table is as shown in FIG. 5c. The entries in the routing table for Machine D 307 all remain unchanged except for those relating to Machine A 301. It can be seen that Machine D 307 will now communicated with Machine A 301 primarily via network B 311, using as an alternate route the fault router 313 via network A 309.

In step 409, the fault is fixed, and Machine A transmits a new notice of a primary and secondary network designations, so that either network A 309 or network B 311 is the new primary or preferred path to Machine A 301, and the other network is the secondary or alternate network path to Machine A 301. Preferably, the new primary network is the same as the original primary network and the new alternate network is the same as the original alternate network. The fault router 313 no longer needs to be used to access Machine A 301 from either network. The notice sent by Machine A 301 may be a broadcast message to all network entities capable of receiving and translating the message, but is more preferably a focussed message sent only to a subset of network entities, such as those with which Machine A has recently or primarily been in contact. At this point, in step 411, the routing table of all network entities that receive and interpret the contents of the notice for Machine A 301 are updated with respect to Machine A 301 to reflect its new primary and alternate pathways.

In the case of multiple simultaneous faults, the fault detection and correction procedure progresses in much the same way as illustrated in FIG. 4. For example, in the situation illustrated in FIG. 3, wherein Machine B 303 and Machine D 307 are faulted on networks A 309 and B 311 respectively, each faulted machine initially detects the fault and transmits to other network machines a notice of new primary and/or alternate paths. In response to the notice, the noticed network entities update their routing tables with respect to the faulted machines. While the faults still exist, connectivity between all machines is still assured, with redundant connectivity still existing between all non-faulted machines, i.e. Machines A 301 and C 305.

Preferably in this situation, all non-faulted machines will communicate with the faulted machines on their non-faulted network connection. With respect to machines that are faulted on opposite networks, such as Machines B 303 and D 307, communication can still take place via the fault router 313. For example, while both faults exist, the routing tables of both faulted machines will appear as depicted by the routing tables in FIGS. 6a and 6b. FIG. 6a is the routing table for Machine B 303 during the time that both faults exist, while FIG. 6b is the corresponding routing table for Machine D 307 at that time. FIG. 6c is the routing table for Machine A 301 at that time.

It can be seen that Machines B 303 and D 307 can still intercommunicate via the fault router 313 even though they are faulted on opposite networks. In fact, as can be seen from FIGS. 6a and 6b, communications between faulted Machines B 303 and D 307 necessarily use the fault router 313 in the illustrated topology because there are only two redundant networks in this example, each of which is faulted with respect to one of these machines.

As can be further seen from FIGS. 6a and 6b, each faulted machine preferably communicates with non-faulted machines via the faulted machine's non-faulted network connection. Likewise, non-faulted machines preferably communicate with each faulted machine via the faulted machine's respective non-faulted network connection. Thus as can be seen in FIG. 6c, Machine A 301 preferably communicates with Machine B 303 via network B 311, and alternatively communicates with Machine B 303 via the fault router 313 by way of network A 309. The communications between non-faulted Machines A 301 and C 305 need not use the fault router 313 at all, either primarily or alternatively.

In an embodiment of the invention, all or some of the network machines support synchronized process control or other time-synchronized operation. In particular, an optionally redundant time strobe synchronization technique is used to time-synchronize network machines such as control stations or process controllers, used for timing-sensitive operations, wherein an electronic differential time strobe synchronization pulse is distributed from master and backup timekeeper stations to the machines. In this way, synchronization between machines is preferably maintained within one millisecond, with no machine being allowed to drift more that 500 milliseconds between synchronization operations. The technique to be described hereinafter not only provides better synchronization than the traditional technique of exclusively using network messages for synchronization, but also provides cost benefits over other traditional methods requiring a PCI timing card for each time-sensitive machine.

Figure 7:
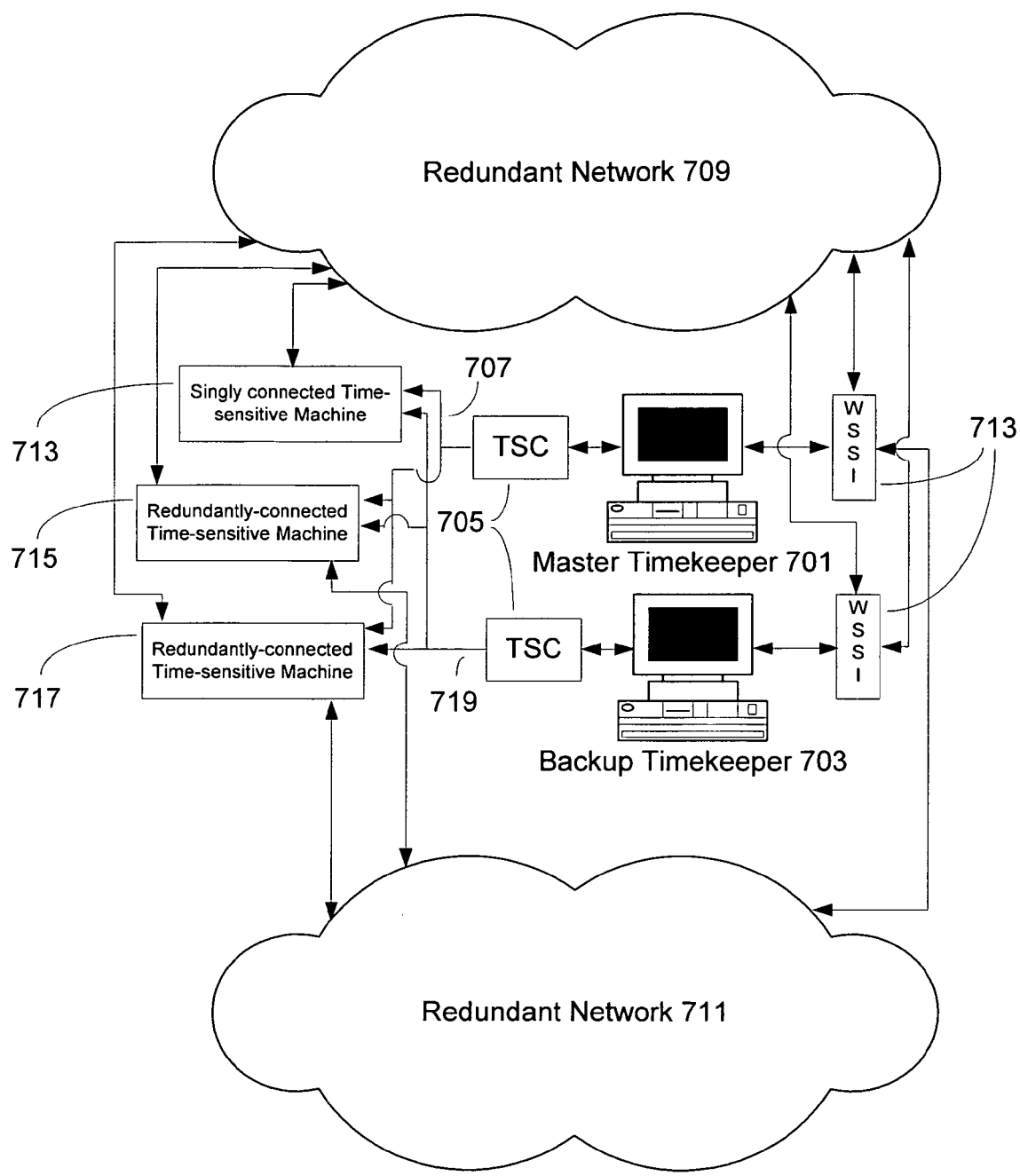
FIG. 7 is a diagram of a network architecture showing a synchronization configuration usable in an embodiment of the invention.

As shown in FIG. 7, the master timekeeper 701 and backup timekeeper 703 are workstations each of which is connected to the redundant networks 709, 711 via a workstation switch interface (WSSI) 713, which will be described in greater detail hereinafter. Each timekeeper 701, 703 contains a peripheral component interconnect (PCI) card for generating a time strobe, such as by receiving a standard GPS satellite timing signal via an antenna. The backup timekeeper 703 provides for machine synchronization in the event that the master timekeeper 701 experiences a failure. This allows for the continuation of time-sensitive processes or procedures despite a failure of the master timekeeper 701.

The time strobe generated by the PCI card is distributed to time-sensitive machines 713, 715, 717 via time strobe converters (TSCs) 705 over separate lines 707, 719. The time strobe signal generated by the PCI card is preferably converted from RS232 to RS485 by the TSC 705. This is done to provide greater signal drive capability as well as signal isolation.

In operation, the operating timekeeper, usually the master timekeeper 701, first sends a network timing message via redundant networks 709 and 711 to all time-sensitive machines 713, 715, 717, indicating that a particular time should be set when the next time strobe is received. Subsequently, the PCI card in the operating timekeeper generates and sends a time strobe that is converted by the TSC 705 and transmitted via line 707 or 719 to all time-sensitive machines 713, 715, 717. Upon receipt of the time strobe, each time-sensitive machine 713, 715, 717 sets its clock in accordance with the network timing message.

Thus for example, the network timing message indicates that at the time strobe the time will be 10:00:00 (hour: minutes: seconds) AM exactly. This message is sent at a prior time such as 9:59:59 AM. At 10:00:00 AM, a time strobe is transmitted, and after insignificant transit and processing delays, each receiving station 713, 715, 717 sets its clock appropriately. Because the time strobe is transmitted on a dedicated line 707, 719 that is separate from either network, there are no time strobe signal delays due to network contention etc.

For most time-sensitive processes, the critical measure of time is relative rather than absolute. That is, it is typically important for each machine to keep time relative to the other machines, but it usually does not matter whether or not that time tracks the actual time of day. So it would generally be sufficient that all machines have their time set at 9:00 AM even though the actual time of day at that moment is actually 10:00 AM. Thus, in an embodiment, in the event that the PCI card loses the satellite signal for any reason, and the backup timekeeper is also similarly disabled, the time strobe timing is generated internally by the card. Thus, interruption of satellite timing signals or destruction of the GPS receiving antenna will not prevent proper relative network synchronization.

Note that the applicability of the time-synchronization technique described above is not limited to a redundant network environment. For example, a singly connected machine, such as machine 713 in FIG. 7, will also benefit from application of the above-described time-synchronization technique, whether in the context of a single network or redundant networks. Similarly, timekeepers 701, 703 need not be interfaced to two parallel networks. More generally, the aforementioned synchronization technique is also applicable to single networks such as that shown schematically in FIG. 1a.

The Work Station Switch Interface (WSSI) 713 is an apparatus for interfacing a workstation having a single network interface or network controller to each network in a redundant network system. Thus the workstation 701, 703 can use its single network controller to direct transmissions to any of the redundant networks 709, 711 in the absence of network connection faults in the WSSI 713 or the workstation 701, 703. The WSSI 713 has any appropriate type of connection to the workstation 701, 703 and to the networks 709, 711. For example, the WSSI 713 can use a copper connection to the workstation 701, 703 and a fiber connection to each of the redundant networks 709, 711. Software on the workstation 701, 703 uses a serial link to the WSSI 713 to select which redundant network should be used to transmit outgoing communications.

The WSSI 713 is not simply a switch, because although it allows transmission on only one network at a given instant for a given machine 701, 703, it continually allows receipt of transmissions from any of the redundant networks 709, 711. In particular, the WSSI 713 interleaves incoming traffic from multiple networks using local storage for buffering. Thus, if receipt of a first transmission from a first network 709 is already in progress when another transmission from another network 711 is received by the WSSI 713, the WSSI 713 buffers the later transmission pending completion of the earlier transmission. The WSSI 713 preferably interleaves the transmissions on a packet level, but may alternatively interleave at a higher level, such as a session level.

Although the WSSI 713 has been described herein with respect to a timekeeper workstation, it will appreciated that the WSSI 713 can be employed with any workstation having only a single active network controller to interface the workstation to the redundant network.

Figure 8:
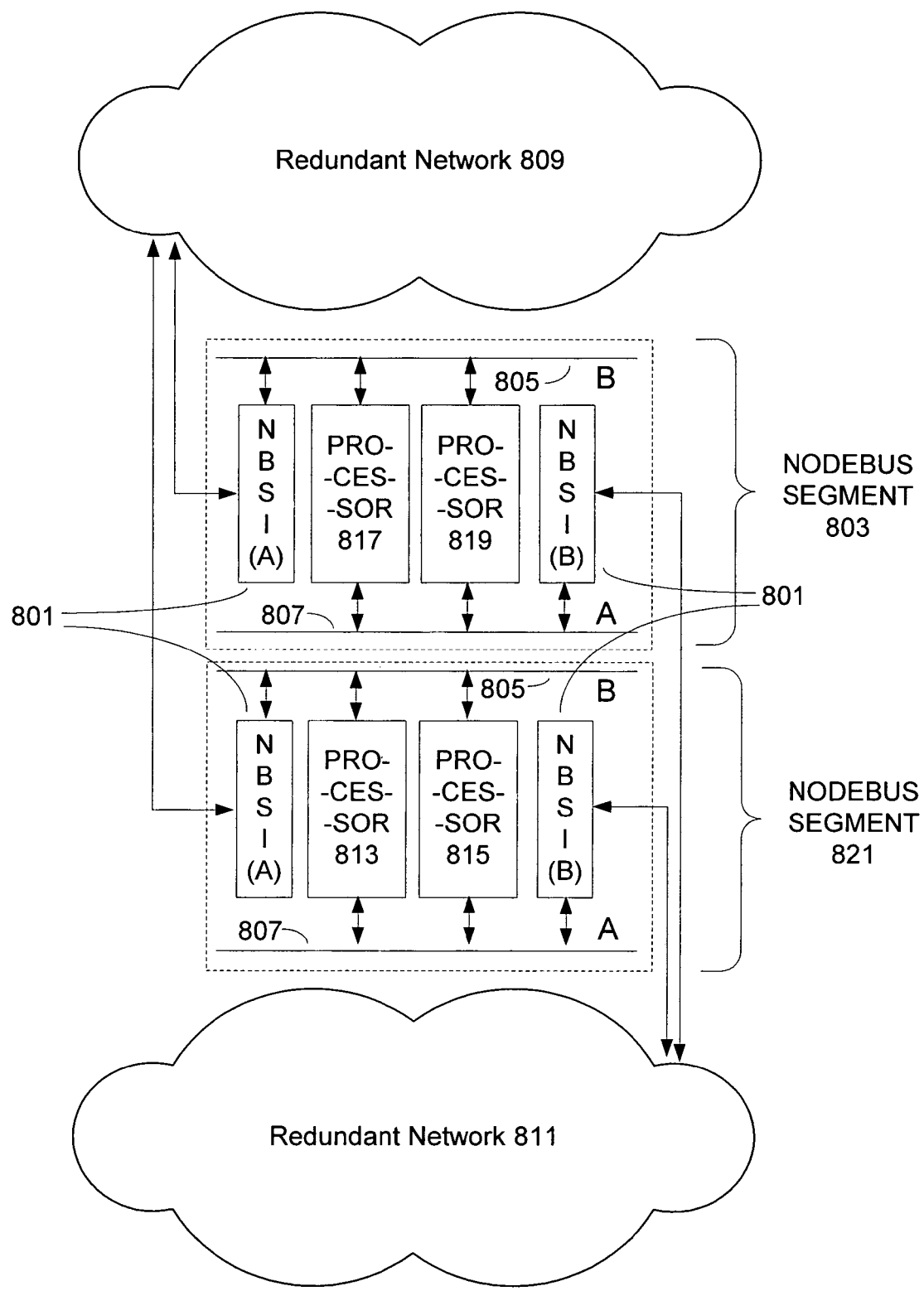
FIG. 8 is a schematic diagram showing the placement and use of a Node Bus Switch Interface module.

In an embodiment, the high performance redundant network system described above interfaces to a node bus such as the I/A SERIES NODE BUS system produced by THE FOXBORO COMPANY. The component used to provide such an interface is referred to herein as a Node Bus Switch Interface module (NBSI). The location of the NBSIs 801 within an environment including the redundant network system is illustrated in FIG. 8 with respect to redundant networks 809 and 811. Essentially, the NBSIs 801 provide a resource for communicating between the redundant network system and a node bus segment 803, 821. The node bus 803, 821 typically operates at a lower rate, e.g. 10 Mbps, compared to the redundant network system which in an embodiment is a switched Ethernet network operating at up to 100 Mbps. The connection between an NBSI 801 and one of the redundant networks 801, 803 can be either copper or fiber, with the copper link being via an RJ-45 connector on the module and the fiber link being via a MT-RJ connector on the module.

The node bus may be logically one network that is nonetheless physically redundant as shown in FIG. 8, via the node bus lines 805 designated as "A" and the node bus lines 807 designated as "B." Thus the NBSI 801 for each redundant network in the redundant network system can be associated with one of the redundant line pair in the node bus segment. Although each NBSI 801 listens to each of the redundant node bus lines for collision avoidance purposes, it preferably sends and receives information from one network only. Thus two or more such modules are used to interface a node bus segment 803, 821 to the redundant networks 809, 811. In order to set each NBSI 801 to send/receive on a particular network, a switch is located on the NBSI module 801 is manipulated to indicate the associated network within the redundant network system.

During operation, the NBSI 801 forwards Ethernet packets between a node bus segment 803, 821 and an associated switched Ethernet network 809, 811. In particular, packets received by the NBSI 801 from node bus machines such as processors 813-819 are forwarded to the associated switched Ethernet network 809, 811 unless the destination address is known to be local to the node bus segment 803, 821. Likewise, packets received by the NBSI 801 from the associated switched network 809 or 811 are forwarded onto the node bus segment 803, 821. As discussed above, an NBSI 801 only forwards packets onto the cable it services, but it checks for a carrier signal on both cables before transmitting on the node bus to avoid node bus collisions. Each NBSI 801 maintains local storage to buffer data while it waits for available bandwidth. This storage is also used to buffer information when a potential overflow is caused by a data rate mismatch between the node bus and the redundant network system. The data rate on the redundant network system will often be an order of magnitude higher than that on the node bus, but the rates depend upon the specific protocols employed and medium used, as will appreciated by those of skill in the art.

It will be appreciated that the NBSI 801 need not forward all Ethernet packets. For example, some Ethernet packets are not addressed to the NBSI 801 or the entities 813-819 it interfaces, while other Ethernet packets simply deal with network management issues. Likewise, the NBSI 801 need not forward all node bus communications to the redundant network system.

Figure 9:
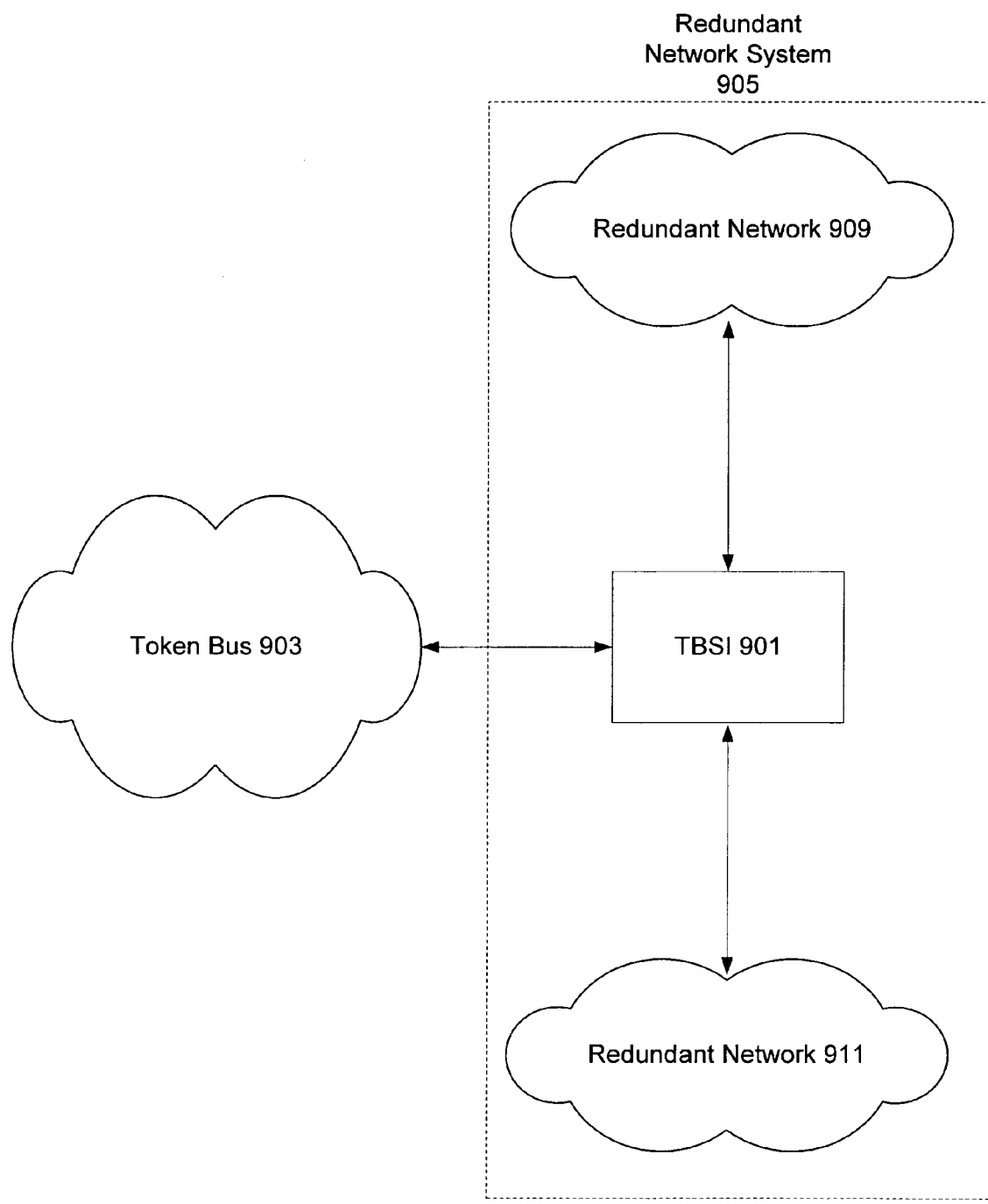
FIG. 9 is a schematic diagram showing the placement and use of a Token Bus Switch Interface.

As illustrated in FIG. 9, in a further embodiment the redundant network system 905 described above interfaces to a carrier band token bus 903 such as the I/A SERIES TOKEN BUS system produced by THE FOXBORO COMPANY via a Token Bus Switch Interface module (TBSI) 901. There are various reasons for the continued use of both network types. For example, a manufacturer may wish to avail itself of the benefits of the redundant network system 905 in a new plant area, while retaining a token bus 903 already in use at the plant. The token bus 903 preferably operates according to the IEEE 802.4 protocol, but alternatively operates according to any other token bus standard. The 802.4 protocol is an IEEE standard for a token bus local area network access method.

As with the NBSI 801 discussed above, the purpose of the TBSI 901 is to provide compatibility between the token bus network 903 such as those of the I/A SERIES TOKEN BUS system and a high performance redundant network system 905 such as described above using fast Ethernet or another standard. Note that the token bus 903 can itself be physically redundant, i.e. it can comprise more than one physical path between network entities, each physical path using the same protocol, such IEEE 802.4, or a different protocol, such as IEEE 802.3, as each other physical path.

The TBSI 901 acts as a converter for communications between the redundant network system 905 and the token bus 903. For example, the 802.4 token bus employs a rotating token, whereas fast Ethernet does not. Thus, the TBSI 901 acts to the token bus 903 as a token bus network node, and to the redundant network system 905 as a fast Ethernet network node. Note that this does not require that all transmissions on one network be passed on in any form to the other network. For example, transmissions on the token bus 903 dealing with the mechanics of the bus need not be passed to the redundant network system. Rather, such communications are simply used by the TBSI 901 to facilitate its communications on the bus 903.

As with the NBSI 801, the TBSI 901 maintains local storage for buffering in the case where the redundant network system 905 and the token bus 903 utilize different data rates. The TBSI 901 preferably comprises an x86 processor for performing the conversion functions and two network controllers, one for the token bus 903, the other for the redundant network system 905.

Although the TBSI 901, NBSI 801, and TSC 705 and their related network entities have been described by way of separate drawings for clarity, it will be appreciated that a non-redundant network environment can also contain and use all of these elements. Transmissions passed between networks of differing types may be particularly addressed or may be broadcast. However, when a TBSI 901 is used to connect an I/A SERIES network to a redundant network system, an NBSI 801 should be used to connect individual I/A SERIES nodes to the redundant network system only if those nodes are disconnected from the I/A SERIES token bus. Otherwise, network congestion caused by communications loops and repropagated broadcasts could disable the system.

Similarly, the TSC 705 or the network messages and time strobes generated thereby can also be employed in any other network type. Thus, for example, in a network environment comprising a redundant network system as described above, a node bus segment, and a token bus network, each network may contain one or more TSCs 705 and associated workstations, or the signals from one TSC 705 may be sent to all of the networks.

It will be appreciated that a novel network fault recovery system for use in a redundant network system has been described herein. Further, network compatibility techniques and structures for facilitating extension of the redundant network system, as well as a novel process synchronization technique have been described. In view of the many possible embodiments to which the principles of this invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof.

We claim:

1. A network comprising:
    a redundant network system comprising two parallel redundant networks using a first networking protocol, and a fault router connected to both parallel redundant networks for routing communications from a first of the networks to a second of the networks, whereby a first network machine connected to both networks but having a fault rendering inoperable its connection to the first network can receive a network communication transmitted on the first network by another network machine;
    a token bus network using a second networking protocol and comprising a second network machine; and
    a token bus interface module situated as a node on the token bus network and as a node on each of the first and second parallel redundant networks, whereby a communication from the second network machine on the token bus network to the first network machine in the redundant network system is received by the token bus interface module and converted into a transmission in the redundant network system according to the first networking protocol.

2. The network of claim 1, wherein the redundant network system accommodates a first rate of data transfer, and the token bus network accommodates a second rate of data transfer, and wherein the first rate of data transfer is greater than the second rate of data transfer.

3. The network of claim 2, wherein the token bus interface module comprises local storage for buffering communications between the token bus network and the redundant network system.

4. A network comprising:
    a redundant network system comprising two parallel redundant networks using a first networking protocol, a first network machine connected to both parallel redundant networks, and a fault router connected to both parallel redundant networks for routing communications from a first of the networks to a second, whereby a network machine connected to both networks but having a fault rendering inoperable its connection to the first network can receive a network communication transmitted on the first network by another network machine;
    a node bus segment using a second networking protocol and comprising a second network machine; and
    a node bus interface module situated as a node on the node bus segment and as a node on each of the first and second parallel redundant networks, whereby a communication from the second network machine on the node bus segment to the first network machine in the redundant network system is received by the node bus interface module and converted into a transmission in the redundant network system according to the first networking protocol.

5. The network of claim 4, wherein the redundant network system accommodates a first rate of data transfer, and the node bus network accommodates a second rate of data transfer, and wherein the first rate of data transfer is greater than the second rate of data transfer.

6. The network of claim 5, wherein the node bus interface module comprises local storage for buffering communications between the node bus network and the redundant network system.

* * * * *